US008732261B2

(12) United States Patent
Fok et al.

(10) Patent No.: US 8,732,261 B2
(45) Date of Patent: May 20, 2014

(54) APPARATUS AND METHODS OF A ZERO SINGLE POINT OF FAILURE LOAD BALANCER

(75) Inventors: Kenny Fok, San Diego, CA (US); Eric Chi Chung Yip, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1332 days.

(21) Appl. No.: 11/946,238

(22) Filed: Nov. 28, 2007

(65) Prior Publication Data

US 2008/0133687 A1 Jun. 5, 2008

Related U.S. Application Data

(60) Provisional application No. 60/868,689, filed on Dec. 5, 2006.

(51) Int. Cl.
G06F 15/16 (2006.01)
H04L 29/08 (2006.01)

(52) U.S. Cl.
CPC ........ *H04L 67/1034* (2013.01); *H01L 67/2861* (2013.01)
USPC ........................................................ 709/209

(58) Field of Classification Search
CPC .................... H04L 67/1034; H04L 67/2861
USPC .................... 709/207–209; 714/100
See application file for complete search history.

(56) References Cited

U.S. PATENT DOCUMENTS

| | | | | |
|---|---|---|---|---|
| 6,006,259 A | * | 12/1999 | Adelman et al. | 709/223 |
| 6,067,545 A | * | 5/2000 | Wolff | 1/1 |
| 6,185,601 B1 | * | 2/2001 | Wolff | 709/203 |
| 6,324,571 B1 | * | 11/2001 | Hacherl | 709/208 |
| 7,225,356 B2 | * | 5/2007 | Monitzer | 714/12 |
| 7,409,420 B2 | | 8/2008 | Pullara et al. | |
| 7,451,221 B2 | * | 11/2008 | Basani et al. | 709/226 |

(Continued)

FOREIGN PATENT DOCUMENTS

| | | |
|---|---|---|
| EP | 2100223 | 1/2011 |
| GB | 2407887 | 5/2005 |
| WO | 2006065661 A | 6/2006 |

OTHER PUBLICATIONS

International Search Report—PCT/US2007/081555. International Search Authority—European Patent Office—Mar. 10, 2009.

(Continued)

*Primary Examiner* — Rupal Dharia
*Assistant Examiner* — Robert B McAdams
(74) *Attorney, Agent, or Firm* — James T. Hagler

(57) ABSTRACT

Apparatus and methods in a load balancer computing apparatus include, in aspects, determining if a master is functioning, and if the master is not functioning, then attempting to become the master by setting a master network identification in a master database table to a self network identification before at least one other slave sets a corresponding other slave network identification as the master network identification in the master database table. In other aspects, the apparatus and methods include assigning each of a group of commands to one of a plurality of slaves, storing the commands and a corresponding assignment in a database table, checking a command status in the database table for each of the group of commands, wherein the command status indicates whether or not the respective command has been executed; and executing a callback function when all the commands are executed.

40 Claims, 7 Drawing Sheets

(56) References Cited

U.S. PATENT DOCUMENTS

| | | | |
|---|---|---|---|
| 7,461,130 B1 * | 12/2008 | AbdelAziz et al. | 709/208 |
| 2002/0019872 A1 * | 2/2002 | Ferwerda et al. | 709/225 |
| 2002/0131423 A1 * | 9/2002 | Chan et al. | 370/400 |
| 2003/0126200 A1 * | 7/2003 | Wolff | 709/203 |
| 2004/0205101 A1 | 10/2004 | Radhakrishnan | |
| 2005/0138517 A1 * | 6/2005 | Monitzer | 714/746 |
| 2006/0168084 A1 * | 7/2006 | Kogan et al. | 709/207 |

OTHER PUBLICATIONS

Written Opinion—PCT/US2007/081555. International Search Authority, European Patent Office—Mar. 10, 2009.

* cited by examiner

| CMD SET ID | NUMBER OF COMMANDS | CALLBACK FUNCTION |
|---|---|---|
| 266 | 268 | 270 |

FIG. 3

| SUB-CMD ID | CMD | CALL-BACK FUNCTION | CALL-BACK FUNCTION STATUS | CMD STATE | START TIME | CMD SET ID | ADDRESS |
|---|---|---|---|---|---|---|---|
| 250 | 252 | 254 | 256 | 258 | 260 | 266 | 264 |

FIG. 4

| MASTER CODE | CREATE TIME | IP ADDRESS OF MASTER |
|---|---|---|
| 280 | 276 | 278 |

FIG. 5

APPARATUS AND METHODS OF A ZERO SINGLE POINT OF FAILURE LOAD BALANCER

CLAIM OF PRIORITY UNDER 35 U.S.C. §119

The present Application for Patent claims priority to Provisional Application No. 60/868,689, entitled "METHOD AND APPARATUS FOR SUPPORTING ZERO SINGLE POINT OF FAILURE LOAD BALANCER," filed Dec. 5, 2006, and assigned to the assignee hereof and hereby expressly incorporated by reference herein.

BACKGROUND

The described aspects relate to distributed processing systems, and more particularly, to apparatus and methods of a zero single point of failure load balancer.

In computer processing, a group of commands can often be divided into individual commands. The commands can be executed in parallel, and then the results can be combined. Additionally, since a single computing apparatus has finite processing capabilities, multiple computing apparatuses may be used to execute the commands. However, using more than a single computing device may create problems in distributing and combining the commands among the computing devices. When multiple computing devices are used, the group of computing apparatuses may be called a processing farm.

Some methods of distributing commands to multiple apparatuses use a master to distribute the commands to a number of slaves and to combine the results of executing the commands. In these methods, the master distributes commands to slaves; the slaves execute the commands; and, the master then combines the results of the executed commands. Each of the slaves and the master may be a separate computing device. The method or apparatus for dividing the commands among the computing devices is often called a load balancer, which may be executed and/or which may reside on the master computing device.

One problem with this method of distributing processes is that if the master malfunctions, then the work may be lost and it may be difficult to replace the master because the master may require specialized hardware and/or software. As such, often a computing apparatus that is more reliable and expensive is used as a master. It may also be difficult upgrading the master without losing the use of all the computing apparatuses.

Another problem is that it may be difficult to add slaves dynamically to the system so that the master can use the slaves without having to reset the system. For example, it may be difficult to add slaves after the software commands have been divided.

Another problem is that it may be difficult to recover when a slave malfunctions and loses the results of executing a command.

And yet another problem with using a master and multiple slaves is that the process for selecting a new master may be complicated. For example, if the master fails or is otherwise inoperative, a procedure must be established to designate a new master that is able to pick up where the previous master left off. Such procedures are often cumbersome.

Thus, improvements in load balancer systems are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a computer-implemented method for a slave computing apparatus of a load balancer comprises determining, according to a common predetermined health maintenance algorithm independently operable by each of a plurality of slaves in the load balancer, if a master of the load balancer is functioning. If the master is not functioning, then the method includes attempting to become the master according to a common predetermined role transitioning algorithm independently operable by each of the plurality of slaves in the load balancer, wherein the predetermined role transitioning algorithm includes setting a master network identification in a master database table to a self network identification before at least one other slave sets a corresponding other slave network identification as the master network identification in the master database table In another aspect, at least one processor configured to act as a slave of a load balancer comprises a first module for determining, according to a common predetermined health maintenance algorithm independently operable by each of a plurality of slaves in the load balancer, if a master of the load balancer is functioning. Further, the at least one processor also includes a second module for attempting, if the master is not functioning, to become the master according to a common predetermined role transitioning algorithm independently operable by each of the plurality of slaves in the load balancer, wherein the predetermined role transitioning algorithm includes setting a master network identification in a master database table to a self network identification before at least one other slave sets a corresponding other slave network identification as the master network identification in the master database table.

In yet another aspect, a computer program product for a slave of a load balancer comprises a computer-readable medium having codes for causing a computer to perform actions. The computer-readable medium includes a first set of codes for causing a computer to determine, according to a common predetermined health maintenance algorithm independently operable by each of a plurality of slaves in the load balancer, if a master of the load balancer is functioning. Further, the computer-readable medium includes a second set of codes for causing the computer to attempt, if the master is not functioning, to become the master according to a common predetermined role transitioning algorithm independently operable by each of the plurality of slaves in the load balancer, wherein the predetermined role transitioning algorithm includes setting a master network identification in a master database table to a self network identification before at least one other slave sets a corresponding other slave network identification as the master network identification in the master database table.

In a further aspect, a slave apparatus of a load balancer comprises means for determining, according to a common predetermined health maintenance algorithm independently operable by each of a plurality of slaves in the load balancer, if a master of the load balancer is functioning, and means for attempting, if the master is not functioning, to become the master according to a common predetermined role transitioning algorithm independently operable by each of the plurality of slaves in the load balancer, wherein the predetermined role transitioning algorithm includes setting a master network identification in a master database table to a self network identification before at least one other slave sets a corresponding other slave network identification as the master network identification in the master database table.

In another aspect, a slave apparatus of a load balancer comprises a health management service operable to determine, according to a common predetermined health maintenance algorithm independently operable by each of a plurality of slaves in the load balancer, if a master is functioning and further operable, if the master is not functioning, to attempt to become the master according to a common predetermined role transitioning algorithm independently operable by each of the plurality of slaves in the load balancer, wherein the predetermined role transitioning algorithm includes setting a master network identification in a master database table to a self network identification before at least one other slave sets a corresponding other slave network identification as the master network identification in the master database table. Additionally, the slave apparatus comprises a database service in communication with the health management service and operable to read and write to the master database table responsive to the health management service.

In still another aspect, a computer-implemented method for a master computing apparatus of a load balancer comprises executing a common predetermined role transitioning algorithm to become a master. The common predetermined role transitioning algorithm is independently operable by each of a plurality of slaves in the load balancer and includes setting a master network identification in a master database table to a self network identification before at least one other slaves sets a corresponding other slave network identification as the master network identification in the master database table. Further, the method includes executing a common predetermined health maintenance algorithm to determine health of each of the plurality of slaves. The common predetermined health maintenance algorithm is independently operable by each of the plurality of slaves in the load balancer. Also, the method includes assigning each of a group of commands to at least one of the plurality of slaves determined to be functioning based on the execution of the predetermined health maintenance algorithm. The method further includes storing the commands and a corresponding assignment in a database table, wherein each assignment comprises a network identification for one of the plurality of slaves assigned to the respective command. Also, the method includes checking a command status in the database table for each of the group of commands, wherein the command status indicates whether or not the respective command has been executed. Additionally, the method includes executing a callback function when all the commands are executed as determined based on the command status.

In a further aspect, at least one processor configured to act as a master of a load balancer comprises a first module for executing a common predetermined role transitioning algorithm to become a master. The common predetermined role transitioning algorithm is independently operable by each of a plurality of slaves in the load balancer and includes setting a master network identification in a master database table to a self network identification before at least one other slaves sets a corresponding other slave network identification as the master network identification in the master database table. Further, the at least one processor includes a second module for executing a common predetermined health maintenance algorithm to determine health of each of the plurality of slaves. The common predetermined health maintenance algorithm is independently operable by each of the plurality of slaves in the load balancer. Also, the at least one processor includes a third module for assigning each of a group of commands to at least one of the plurality of slaves determined to be functioning based on the execution of the predetermined health maintenance algorithm. Further, the at least one processor includes a fourth module for storing the commands and a corresponding assignment in a database table, wherein each assignment comprises a network identification for one of the plurality of slaves assigned to the respective command. The at least one processor further includes a fifth module for checking a command status in the database table for each of the group of commands, wherein the command status indicates whether or not the respective command has been executed, and a sixth module for executing a callback function when all the commands are executed as determined based on the command status.

In another aspect, a computer program product comprises a computer-readable medium having codes for performing actions. The computer-readable medium includes a first set of codes causing a computer to executing a common predetermined role transitioning algorithm to become a master. The common predetermined role transitioning algorithm is independently operable by each of a plurality of slaves in the load balancer and includes setting a master network identification in a master database table to a self network identification before at least one other slaves sets a corresponding other slave network identification as the master network identification in the master database table. Further, the computer-readable medium includes a second set of codes causing the computer to execute a common predetermined health maintenance algorithm to determine health of each of the plurality of slaves. The common predetermined health maintenance algorithm is independently operable by each of the plurality of slaves in the load balancer. Also, the computer-readable medium includes a third set of codes causing the computer to assign each of a group of commands to at least one of the plurality of slaves determined to be functioning based on the execution of the predetermined health maintenance algorithm. Further, the computer-readable medium includes a fourth set of codes causing the computer to store the commands and a corresponding assignment in a database table, wherein each assignment comprises a network identification for one of the plurality of slaves assigned to the respective command. The computer-readable medium also includes a fifth set of codes causing the computer to check a command status in the database table for each of the group of commands, wherein the command status indicates whether or not the respective command has been executed. Additionally, the computer-readable medium includes a sixth set of codes causing the computer to execute a callback function when all the commands are executed as determined based on the command status.

In a further aspect, a master apparatus of a load balancer comprises means for executing a common predetermined role transitioning algorithm to become a master. The common predetermined role transitioning algorithm is independently operable by each of a plurality of slaves in the load balancer and includes setting a master network identification in a master database table to a self network identification before at least one other slaves sets a corresponding other slave network identification as the master network identification in the master database table. Further, the master apparatus includes means for executing a common predetermined health maintenance algorithm to determine health of each of the plurality of slaves. The common predetermined health maintenance algorithm is independently operable by each of the plurality of slaves in the load balancer. Also, the master apparatus includes means for assigning each of a group of commands to at least one of the plurality of slaves determined to be functioning based on the execution of the predetermined health maintenance algorithm. Additionally, the master apparatus includes means for storing the commands and a corresponding assignment in a database table, wherein each assignment comprises a network identification for one of the plurality of slaves assigned to the respective command. Further, the master apparatus comprises means for checking a command status in the database table for each of the group of commands, wherein the command status indicates whether or not the respective command has been executed. Additionally, the master apparatus comprises means for executing a callback function when all the commands are executed as determined based on the command status.

In yet another aspect, a master apparatus of a load balancer comprises a health maintenance service operable to execute a common predetermined role transitioning algorithm to become a master. The common predetermined role transitioning algorithm is independently operable by each of a plurality of slaves in the load balancer and includes setting a master network identification in a master database table to a self network identification before at least one other slaves sets a corresponding other slave network identification as the master network identification in the master database table. Also, the health maintenance service is further operable to execute a common predetermined health maintenance algorithm to determine health of each of the plurality of slaves, wherein the common predetermined health maintenance algorithm is independently operable by each of the plurality of slaves in the load balancer. The master apparatus also includes a distribution service operable to each of a group of commands to at least one of the plurality of slaves determined to be functioning based on the execution of the predetermined health maintenance algorithm. Further, the master apparatus comprises a database service in communication with the distribution service and operable to store the commands and a corresponding assignment in a database table, wherein each assignment comprises a network identification for one of the plurality of slaves assigned to the respective command. Also, the distribution service is further operable to check a command status in the database table for each of the group of commands, wherein the command status indicates whether or not the respective command has been executed. Additionally, the master apparatus comprises a user command executor operable to execute a callback function when all the commands are executed as determined based on the command status.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 3 is a schematic diagram of one aspect of components of a database table of a zero single point of failure load balancer system of FIG. 1;

FIG. 4 is a schematic diagram of one aspect of components of a database table of a zero single point of failure load balancer system of FIG. 1;

FIG. 5 is a schematic diagram of one aspect of components of a database table of a zero single point of failure load balancer system of FIG. 1;

DETAILED DESCRIPTION

Figure 1:
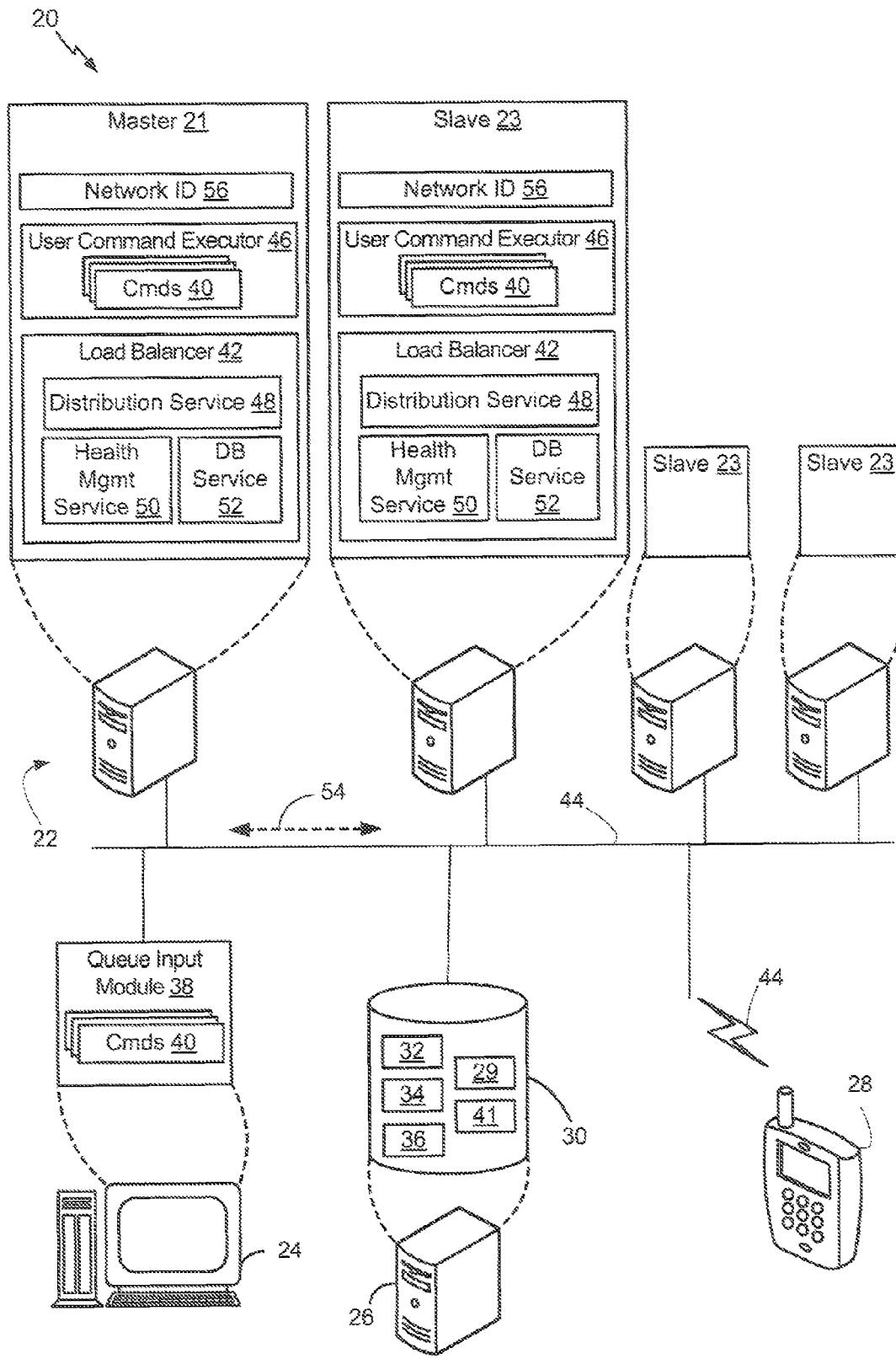
FIG. 1 is a schematic diagram of one aspect of a zero single point of failure load balancer system.

The apparatuses and methods described herein provide for dividing a group of commands into individual commands and distributing the commands to multiple computing devices, and then combining the results of the executed commands. The system comprising the computing devices may be called a processing farm. In some aspects, each of the computing devices uses the same method. The method may begin with each of the computing devices attempting to become the master. One of the computing devices succeeds and becomes a master and each of the remaining computing devices becomes a slave. Advantageously, the method may be implemented independently by each computing device, without requiring a separate controller to identify the master. Commands are submitted to the master for execution. The master divides the plurality of commands into individual commands. For example, the plurality of commands may be received together, e.g. in a script, and a load balancer component on the master computing device splits the script up into one command for each line of the script, and distributes the commands to the slaves. In some aspects, the slaves take the distributed commands from the master and execute the respective commands, returning the respective result to the master. The master keeps track of the distributed commands, and will compile and return a result when the result of all related distributed commands are available.

Additionally, the master may regularly check to insure each of the slaves is functioning. If a slave is not functioning then the distributed commands assigned to the non-functioning slave are reassigned to another slave and/or the master may execute the respective distributed commands.

Further, at least one of the slaves may regularly check to insure that the master is still functioning. If a slave determines that the master is not functioning, then the slave will attempt to become the master according to an independently executable method. In some aspects, each of the slaves may attempt to become the master until one of the slaves succeeds and becomes the new master. The slaves that did not become the master will continue to work as slaves. The slaves may use a database to determine which slave becomes the master. In some aspects, a master code, such as a constant value, may be used as a primary key in a master database table in the database so that only one slave can become the master.

Additionally, in some aspects, the master may use a database to maintain an assignment record and a status of each distributed command.

Thus, a system for a zero point of failure balancer is realized by one or more of: each of the slaves regularly checking the status of the master; by at least one of the slaves attempting to become the master if the master is not functioning; by the slaves using a database to determine which slave becomes the new master; by the master regularly checking the status of each of the slaves; or by the master using a database to maintain the tasks. Additionally, by each of the computing devices using the same method, only one method needs to be developed and maintained.

Referring to FIG. 1, aspects of a zero point of failure load balancer system 20 comprise computing devices 22, 24, 26, and communication device 28. In FIG. 1, one of the computing devices 22 is the master 21 and at least one of the other computing devices 22 is a slave 23. Each of the computing devices 22 may be running a method for providing a zero point of failure load balancer system 20. The method provides at least two roles for each computing device 22, one role to work as a slave 23 and the other role to work as a master 21.

In system 20, the designated master 21 of the computing devices 22 receives one or more commands 40 from a queue input module 38 of computing device 24, such as via communication network 44. For example, each command 40 may relate to processing of communication device-related data 29 collected from one or more communication devices 28 and stored in database 30. For instance, communication device-related data 29 may include information relating to one or more of the operation of one or more communication devices on a corresponding one or more wireless communication networks, a status of one or more communication device components, such as hardware and/or software, or some combination and/or some correlation of both. As such, command 40 may relate to determining statistics and/or other characteristics associated with one or more communication devices 28, with the wireless networks on which communication device(s) 28 operate(s), or some combination of both.

In any case, in order to increase the efficiency of processing one or more commands 40, master 21 executes a load balancer module 42 operable via a distribution service 48 to distribute one or more of the commands 40 to one or more of the computing devices 22, including the slaves 23 as well as the master 21, for processing. For example, each command 40 may be broken down into more than one sub-command and distributed. In particular, each computing device 22 includes a user command executor 46 operable to process one or more of the commands 40 and return the result back to master 21. Load balancer 42 on the master 21 is then operable to reassemble all of the results, with an optional aspect of further processing the results, and return a final end result 41 corresponding to the respective command 40. For example, final end result 41 may be stored in database 30, with a reference to the corresponding command 40, enabling an authorized user, such as the user of computing device 24, to retrieve and view the final end result 41. As noted above, final end result 41 may be some sort of characteristic related to one or more communication devices 28 or one or more wireless networks based at least in part on the data 29 collected from one or more communication devices 28. Further, in a zero point of failure aspect, each computing device 22, such as the slaves 23, also includes a similar load balancer module 42 to communicate with the load balancer module 42 of the master 21, or to perform the master load balancing functions if the respective computing device 22 becomes the master.

Further, master 21 includes a database service 52 operable to provide a communication interface with database 30 in order to store information related to the assigned processing tasks and the final end result 41, as well as information relating to the method for establishing the master 21 and slaves 23. In a zero point of failure aspect, database 30 comprises a storage mechanism having high reliability and built-in redundancy systems. For example, database 30 may include a command index table 32 that stores references to each command 40 received by master 21. Further, database 30 may include a sub-command index table 34 that stores references to the various commands distributed by master 21 to the computing devices 22, and the status of the distributed commands, corresponding to the processing of a respective command 40. Additionally, in a zero point of failure aspect, database 30 may include a master table 36 that stores information relating to the master 21, and used for establishing a new master. Further, in a zero point of failure aspect, each computing device 22, such as the slaves 23, also includes a similar database service 52 to interface with database 30 and/or the database service 52 of the master 21.

Additionally, in a zero point of failure aspect, master 21 includes a health management service 50 operable to regularly attempt to contact each of the slaves 23 over the communications network 44. If a slave 23 is not reachable, then master 21 assumes the respective slave 23 is not functioning and acts to redistribute any commands 40 assigned to the respective slave 23 for processing. For example, the distribution service module 48 of the master 21 may update the sub-command index table 34 and redistribute the commands 40 from each unreachable slave 23 to another slave 23 that is reachable.

Correspondingly, the health management service 50 of each slave 23 may regularly attempt to contact the master 21. If the health management service 50 of a slave 23 determines that the master 21 is not functioning properly, e.g. if no response from the master is received, then the health management service 50 of a slave 23 will attempt to change the role of the respective slave 23 to the role of master 21. The health management service 50 of the slave 23 may attempt to become the master 21 by using the master table 36 of the database 30 to manage the communication among the slaves 23. In some aspects, the master table 36 uses a master code that may be a constant, where the master code is the primary key of the master table 36 so that only a single slave 23 will successfully write to the master table 36. In some aspects, communication among the slaves 23 in determining which slave 23 will become the master 21 is managed by implementing or imitating a semaphore using a row in the master table 36 of the database 30. In some aspects, the slaves 23 and the master 21 communicate with one another and with the database 30 using a communication message 54, and use a network identifier (ID) 56 to identify one another.

Thus, system 20 provides apparatus and methods for a zero point of failure load balancer by providing master 21 with a database 30 to manage the distribution of commands 40 to the slaves 23, and by the slaves 23 regularly checking the status of the master 21 and attempting to become the master 21 if the master 21 stops functioning properly. Further, the master 21 regularly checks the status of each of the slaves 23, and if a slave 23 does not respond, then the master 21 reassigns the commands 40 assigned to the unreachable slave 23 to reachable slaves 23 and/or the master 21. In some aspects, the commands 40 and their status are stored in the database 30. Thus, system 20 advantageously provides a zero point of failure system that distributes commands among the computing devices 22, manages the command distribution via storing command-related information in database 30, maintains the health of the system via communication between health management services 50, and manages determination of a master 21 for load balancing via the database 30.

Figure 2:
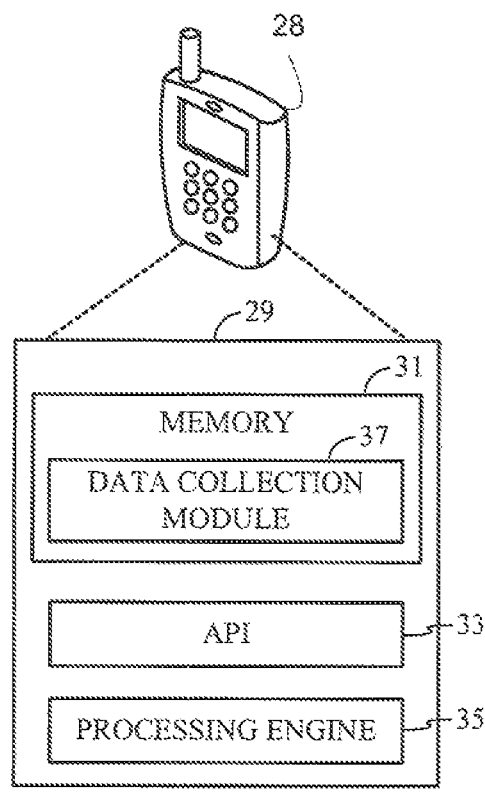
FIG. 2 is a schematic diagram of one aspect of components of a communication device of the system of FIG. 1.

Referring to FIGS. 1 and 2, communication device 28 may comprise any type of device operable to exchange messages with communications network 44. For example, communication device 28 may comprise a mobile communication device, such as a wireless and/or cellular telephone. It should be understood that communication device 28 is not limited to the illustrated device, but may further include a Personal Digital Assistant (PDA), a two-way text pager, a portable computer having a wired or wireless communication portal, and any type of computer platform having a wired and/or wireless communications portal. Further, communication device 28 can be a remote-slave or other similar device, such as remote sensors, remote servers, diagnostic tools, data relays, and the like, which does not have an end-user thereof, but which simply communicates data across a wireless or wired network. Additionally, it should be noted that any combination of any number of communication device 28 may be utilized in system 20. Further, it should be noted that although a distinction has been made between a communication device 28 and a computing device 22, 24 and 26 that some devices may serve as both a communication device 28 and a computing device 22, 24, and 26.

In particular, system 20 operates to collect data from one or more communication devices 28, and then to process and analyze the collected data using master computing device 21 and slave computing devices 23. Specifically, a user of computing device 24, such as a remote computer, enters one or more commands 40 into a queue input module 38, which forwards the commands 40 to master computing device 21. The one or more commands 40 generally relate to the identification of data to collect, and/or the identification of the analysis to perform on the collected data. Master computing device 21 then executes load balancer module 42 to process the one or more commands 40 and return the result to computing device 24.

As such, communication device 28 includes a computer platform 29 having a memory 31 that stores at least a data collection module 33 for collecting requested data relating to the communication device, the communication network, or some combination thereof. Data collection module 33 may include any combination of hardware, software and firmware, and is operable to be dynamically configured to collect any desired data. Computer platform 29 further includes a processor 35 for executing the data collection module 33. Further, computer platform 29 may include an application programming interface (API) 37 to enable communication between data collection module 33 and processor 35.

API 37 may be a runtime environment executing on the respective communication device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices. In other aspects, API 37 may be an operating system such as Microsoft WINDOWS, LINUS, and MAC OS. The operating system may provide for multiple processes and/or threads of execution that allow execution of multiple processes.

Additionally, in some aspects, processor 35 may include various processing subsystems embodied in hardware, firmware, software, and combinations thereof, that enable the functionality of communication device 28 and the operability of the communication device 28 on communications network 44 (FIG. 1). For example, processing subsystems allow for initiating and maintaining communications, and exchanging data, with other networked devices as well as within and/or among components of communication device 28. In one aspect, such as in a cellular telephone, processor 35 may include one or a combination of processing subsystems such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM (universal subscriber identity module/subscriber identity module), voice services, graphics, USB (universal serial bus), multimedia such as MPEG (Moving Picture Experts Group) protocol multimedia, GPRS (General Packet Radio Service), short message service (SMS), short voice service (SVS™), web browser, etc. In some aspects, data collection module 33 collects data from one or more processing subsystems, where the data may comprise log codes, over the air events such as data packets corresponding to a communication protocol used by communication device 28, data describing one or more hardware and/or software components of communication 28, such as a current state, a usage amount, etc., or any combination thereof.

Computing device 26 operates database 30, which executes portions of the load balancing and data processing aspects discussed herein, and which may additionally store the data collected from one or more communication devices 28.

Database 30 may be a structured collection of data. In one aspect, the database 30 may be enabled by a database management system (DBMS) such as ORACLE, MYSQL, or Microsoft ACCESS running on computing device 26. The database 30 includes built-in redundancy systems, such as clusters and redundancy databases, which provide a high reliability and reduce the likelihood of failure. The DBMS enables writing and reading rows (sometime referred to as tuples) of the database 30, and the creation and deletion of database tables, such as tables 32, 34 and 36. Although FIG. 1 illustrates the database 30 as being implemented by a single computing device 26, the database 30 may be implemented by many computing devices with multi-redundancy. Further, the database 30 may be implemented in more than one storage mechanism.

The database 30 may be composed of tables, such as in FIGS. 3-5. The tables comprise rows of data where the columns are the name of the data and the values of the data comprise the row of the table. A table of the database 30 may have a primary key. When a database 30 has a primary key, then only a single row with a particular value may be a member of the table. In general, the DBMS enables computing devices 22, 24, 26 to write and read rows from tables in the database 30. In general, the values of the rows may be any type of data that can be read and written to computer memory, including the commands 40 sent by master 21 to slaves 23.

Referring to FIGS. 1, 3 and 4, in an aspect, two tables 32 and 34 of the database 30 may be used to maintain the status of one or more commands 40. Command index table 32 may be utilized to track each command 40 and its corresponding sub-commands distributed for processing, while sub-command index table 34 may be utilized to track the status of each sub-command and its relationship to command 40.

In one aspect, command index table 32 includes the following fields: command set identifier (CMD SET ID) 266 may be the primary key for command index table 32, and comprises a unique identifier for the respective command 40; number of commands 268 may be the total number of sub-commands distributed to process the corresponding command 40; and callback function 270 may comprise a mechanism, such as a script, to be called when the group of commands 40 is successfully executed. For example, callback function 270 may comprise an operation to assemble the results of the group of commands 40 into a single result, an operation or function to perform on at least one of the results of the group of commands 40 to generate a new result for the group of commands 40, etc. Further, for example, user command executor 46 or some portion of load balancer 42, such as distribution service 48, may execute or initiate callback function 270.

Sub-command index table 34 may be used to store the actual sub-commands and to maintain the status of the sub-commands. Sub-command index table 34 may comprise the following fields: sub-command identifier (SUB-CMD ID) 250 may be the primary key for each row of sub-command index table 34, and includes a unique identifier that may be generated for every sub-command distributed by the load balancer 42; command (CMD) 252 may be one single sub-command, corresponding to command 40, for processing by the respective user command executor 46 of the assigned computing device; callback function 254 comprises a mechanism, such as a script, to be called when the group of commands is successfully executed; Callback Function Status 256 is the state of the callback function, for example in one non-limiting case, submitted=0, under execution=1, executed=2; Command (CMD) State 258 comprises a value corresponding to the state of the sub-command, e.g. submitted=0, under execution=1 and executed=2; start time 260 comprises a time at which the respective sub-command is sent for execution to the respective user command executor 46; command (CMD) set ID 266 is the identifier associated with each group of sub-commands that references back to a respective command 40, where CMD Set ID 266 corresponds to the value for the respective command 40 as established in command index table 32, and in some aspects, CMD Set ID 266 can be used as callback function id; and address 264 may be an identifier, such as an Internet Protocol (IP) address or the network ID 56, of the computing device 22 to which the respective sub-command 40 is assigned for execution.

Thus, command index table 32 and sub-command table 34 allow for the management and tracking of the distributed processing of each command 40, and further provide a mechanism that allows any device that transitions into the role of master 21 to determine the current status of system 20.

Further, referring to FIGS. 1 and 5, in an aspect, master table 36 may be utilized for maintaining the identity of the master 21 and for managing which computing device 22 becomes the master 21. The master table 36 comprises the following fields: master code 280, which comprise a primary key for the master table 36 and identifies that a master is established; create time 276 may be the time when the respective master code 280 was inserted; and master address 278 may be an identifier, such as an IP address or the network ID 56, of the computing device 22 that sets itself as the master. If master code 280 comprises a predetermined value indicating the respective row identifies the master 21, then master address 278 will identify the computing device that is the current master 21. In general, master table 36 may be used to resolve a section of code between the master 21 and the slaves 23 in order to determine which computing device is the master. Since there are multiple computing devices 22, each of which may attempt to become the master 21 at approximately the same time, then some means of communicating must be used to enable the computing devices to determine the master. As such, master table 36 is used to implement or simulate a software semaphore solution, such as Dijkstra's algorithm. Thus, when master code 280 is utilized as a primary key of the master table 36, then only one computing device can write its identity in the master table 36 and thus become the master.

Therefore, by using a database 30 for the slaves 23 and the master 21 to determine which of the computing devices 22 becomes the master 21, and by using the database 30 to provide the network ID 54 of the master 21, aspects of a system 20 for a zero point of failure load balancer is realized.

Referring back to FIG. 1, as mentioned above, computing device 24 includes a queue input module 30 that operates to allow a user to issue commands 40 to system 20 to collect data and/or analyze collected data. In particular, queue input module 38 may comprise one or any combination of hardware, software, firmware, data and executable instructions operable to provide computing device 24 with the ability to input commands 40 to the load balancer 42 of the master 21. In some aspects, queue input module 38 may be text based and allow a user to input textual commands 40 such as a command script that is then sent to the load balancer 42 of the master 21. Thus, queue input module 38 enables commands 40 to be input to the system 20 by permitting commands 40 to be received and sent to the load balancer 42 of the master 21.

Additionally, referring to FIG. 1, computing device 22, 24, and 26 may comprise any type of computing device. For example, as illustrated in FIG. 1, computing device 22, 24, and 26 may comprise a fixed computing device, such as a network device, a server, a computer workstation, etc. It should be understood that computing devices 22, 24 and 26 are not limited to the illustrated devices, but may further include a portable computer having a wired or wireless communication portal, and any type of computing device having a wired and/or wireless communications portal. Additionally, although computing devices 22 are illustrated in a similar manner, it should be noted that each of computing devices 22 may be a different type of computing device. Further, computing device 22, 24, and 26 can be a remote-slave or other similar computing device, such as a remote server, which does not have an end-user thereof, but which simply communicates data across a wireless or wired network 44. In alternate aspects, each of computing devices 22, 24, and 26 may be multi-processor systems. Additionally, it should be noted that any combination of any number of computing devices 22, 24, and 26 may be utilized in system 20. Therefore, the present apparatus and methods can accordingly be performed on any form of computing device connected to a wired or wireless communication network 44.

Figure 6:
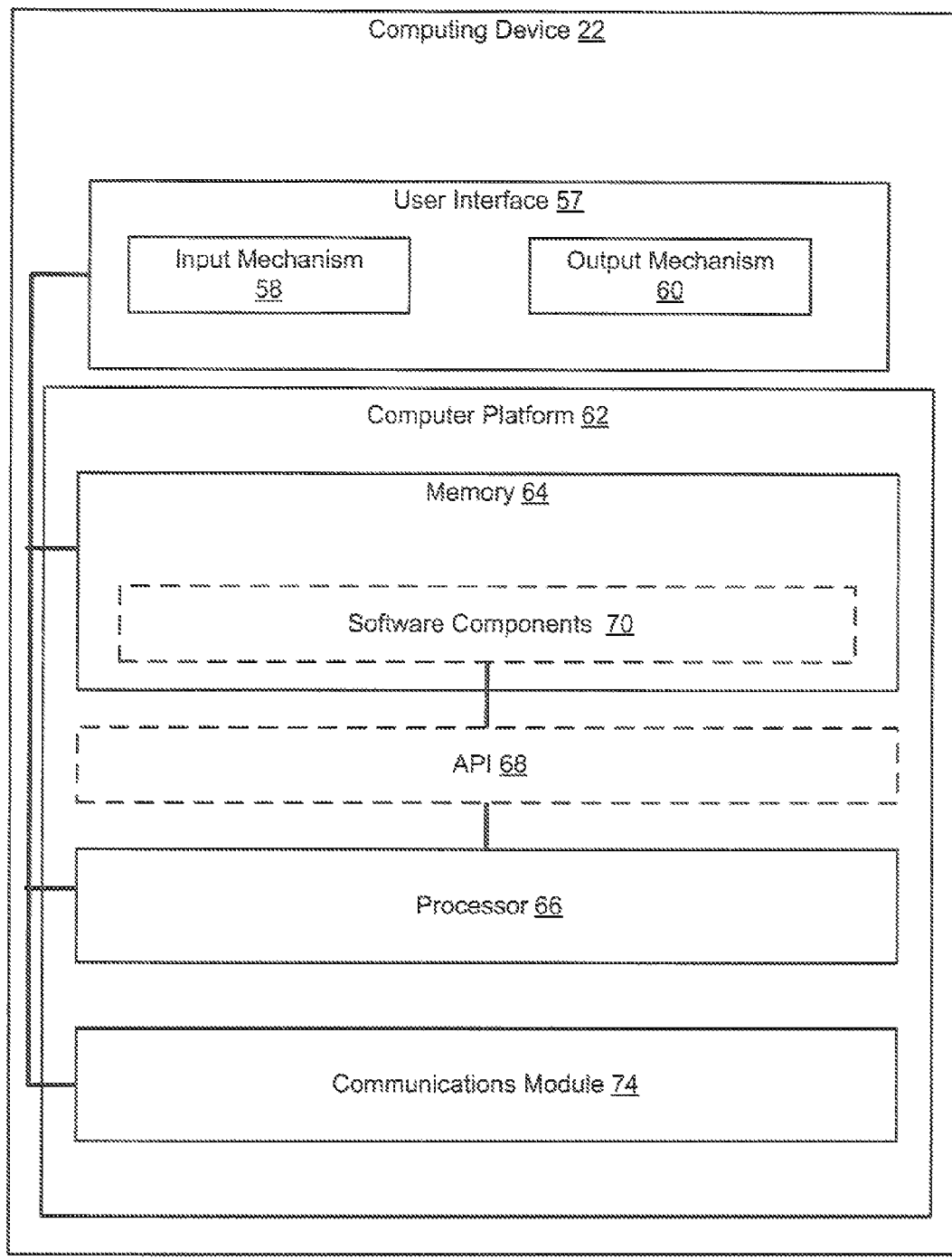
FIG. 6 is a schematic diagram of one aspect of components of a computing device of the system of FIG. 1.

Additionally, referring to FIG. 6 (which, for simplicity, references computing device 22), computing devices 22, 24, 26 may include a user interface 57 in communication with a computer platform 62 that includes a memory 64 having instructions executable by a processor 66, and further including a communications module 74 enabling communication within and to or from the respective computing device.

User interface 57 includes an input mechanism 58 operable to generate or receive an input into the device 22, and an output mechanism 60 operable to generate and/or present information for consumption by the user of the device 22. For example, input mechanism 58 may include at least one mechanism such as a keypad and/or keyboard, a mouse, a touch-screen display, a microphone in association with a voice recognition module, etc. In certain aspects, input mechanism 58 may provide for user input of at least a portion of commands 40. Further, for example, output mechanism 60 may include a display, an audio speaker, a haptic feedback mechanism, etc. Output mechanism 60 may generate a graphical user interface, a sound, a feeling such as a vibration, etc.

Further, memory 64 may comprise volatile and nonvolatile memory portions, such as read-only and/or random-access memory (RAM and ROM), erasable programmable read-only memory (EPROM), electrically erasable programmable read-only memory (EEPROM), flash memory, and/or any memory common to computer platforms. Additionally, memory 64 may include active memory and storage memory, including an electronic file system and any secondary and/or tertiary storage device, such as magnetic media, optical media, tape, soft and/or hard disk, and removable memory components.

Further, computer platform 62 includes at least one processor 66, which may be an application-specific integrated circuit (ASIC), or other chipset, logic circuit, or other data processing device. In some optional aspects, as identified by dashed lines, processor 66 may execute an application programming interface (API) layer 68 that interfaces with any resident software components 70, such as any applications or modules in memory 64.

Additionally, communications module 74 enables communications among the various components of the respective communication device 22, as well as being operable to exchange communications message 54 (FIG. 1) between the device and communications network 44 (FIG. 1). Communications module 74 may be embodied in hardware, firmware, software and/or combinations thereof, and may further include all protocols for use in intra-device and inter-device communications. Further, communications module 74 is operable to transmit and/or receive information, such as communications message 54, in accordance with the apparatus and methods described herein.

Referring back to FIG. 1, in some aspects, communications message 54 may represent a heartbeat request, which is a request for the requested computing device 22 to respond, or an acknowledgement indicating a receipt of the heartbeat request or indicating the receipt of another type of communication message 54. In other aspects, communication message 54 may comprise commands 40 sent to slaves 23, or the result of execution of the commands 40 sent to the master 21. In still other aspects, communication message 54 may be commands to read or write all or parts of database tables 32, 34, and 36. And in still other aspects, communication message 54 may be commands sent to a communications device 28 to gather data corresponding to the operation of the communication device 28, and communication message 54 may be the data the communication device 28 has gathered. In general, communication message 54 enables communication device 28 and/or computing device 22, and/or 24, and/or 26 to communicate across communication network 44. It should be noted that communication message 54 may be converted from one format to another by the communication network 44. For example, communication message 54 may originate as a TCP/IP packet from a computing device 22 and be converted into a wireless format in order for the communication packet 54 to be transmitted to communications device 28.

Additionally, referring to FIG. 1, a memory of each respective computing device 22 may be operable to store all or at least a portion network identifier (ID) 56. Network ID 56 may be any type of identifier for the computing device 22, 24, 26, and/or communication device 28. In some aspects, Network ID 56 may be the IP address of the computing device 22, 24, 26 or may be an ID to identify a wireless communication device 28 such as a cellular telephone number. In some aspects, network ID 56 may not directly identify the network location of the computing device 22, 24, and 26 or communication device 28, but may provide information that can be used by the load balancer 42 to locate the computing device 22, 24, and 26 or communication device 28.

Additionally, a memory of each respective computing device 22 may be operable to store all or at least a portion of command 40. Command 40 may be any type of command for the system 20 to execute. Command 40 may be a single command 40 or command 40 may be a group of commands or sub-commands, e.g. a command script. Command 40 may include textual commands, binary executables, and in general command 40 includes any form of representation that may be stored in memory 64, and that directs the operation of the system 20. In some aspects, command 40 includes a series of commands 40 for a user manager of a wireless device management system. Command 40 may include commands instructing the master 21 where to place the results of executing the command 40. Command 40 may further include instructions that are intended for execution by another device. For example, in one aspect, command 40 may include instructions for a wireless communication device 28 instructing the wireless device 28 to collect statistics regarding the operation of the wireless devices 28. The command 40 may include instructions for where the wireless device 28 should send the result of collecting the statistics regarding the operation of the wireless device 28, e.g. database 30. Command 40 may take many days to complete or may be a command 40 that is immediately executable. Additionally, command 40 may include an instruction for the respective load balancer 42 of the master 21 to further process of the resulting data returned from slaves 23 executing sub-commands associated with the respective command 40. Further, the master 21 may add additional information not contained in the command 40 in order to facilitate distributing, executing, and returning results of the commands 40. Additionally, the execution of the command 40 may generate data that may be stored on the respective computing device 22 and returned to some predetermined place on the network, such as to master 21 or database 30, or both.

Figure 7:
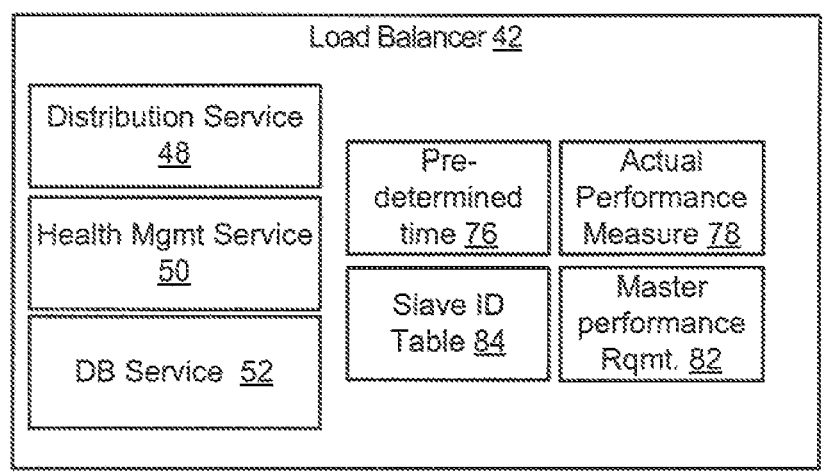
FIG. 7 is a schematic diagram of one aspect of additional components of a load balancer of the system of FIG. 1.

Referring to FIGS. 1 and 7, load balancer 42 may be stored in and executed by each respective computing device 22. Load balancer 42 may comprise one or any combination of hardware, software, firmware, data and executable instructions operable to provide the respective computing device 22 with the ability to distribute commands to, or receive commands from, other computing devices 22 and to manage the system 20. In particular, load balancer 42 of each computer 22 may have three states. A first one of the states is a master state, where the master 21 (FIG. 1) receives and distributes the commands 40. A second one of the states is a slave state, where the load balancer 42 acts as a slave 23 (FIG. 1) by receiving commands 40, executing the commands 40, and then returning the results of the execution to the master 21. And, a third state is a role transition state, where the load balancer 42 is not acting as a master 21 or a slave 23, but may be initializing a role transition between a master 21 and a slave 23. It should be noted that by using these three states for load balancer 42, it is possible to use a single method for both the slaves 23 and the master 21, so that slaves 23 can role transition to master 21 and the master 21 can role transition to a slave 23, thereby avoiding the requirement of a separate controller to manage such transitions.

As noted above, load balancer 42 may be divided into three modules: distribution service module 48, health management service 50, and database service module 52; however, the functionality provided by load balancer 42 may be split among other modules or incorporated into a single module. As such, in some aspects, load balancer 42 provides the computing device 22 with at least the ability to communicate with a corresponding load balancer 42 on other computing devices 22, with the ability to distribute commands to other computing devices 22 or receive commands from other computing devices, with the ability to manage the health state of the system 20, and with the ability to read and write to the database 30.

Health maintenance service 50 may be stored in and executed from a memory of a respective computing device 22. Health maintenance service 50 may comprise one or any combination of hardware, software, firmware, data and executable instructions operable to provide the respective computing device 22 with the ability to maintain the health of the system 20. In general, health maintenance service 50 provides the ability for computing devices 22 acting as a slave 23 to insure that a master 21 is functioning properly. Further, if the master 21 is not functioning properly, then health maintenance service 50 provides the ability for computing devices 22 acting as a slave 23 to attempt to become the master 21. Further, the health maintenance service 50 provides the ability for the computing device 22 acting as the master 21 to insure that the slaves 23 are functioning properly. If a slave 23 is not functioning properly, then health maintenance service 50 provides the ability for computing device 22 acting as master 21 to redistribute any commands that may have been assigned to the malfunctioning slave 23.

Figure 8:
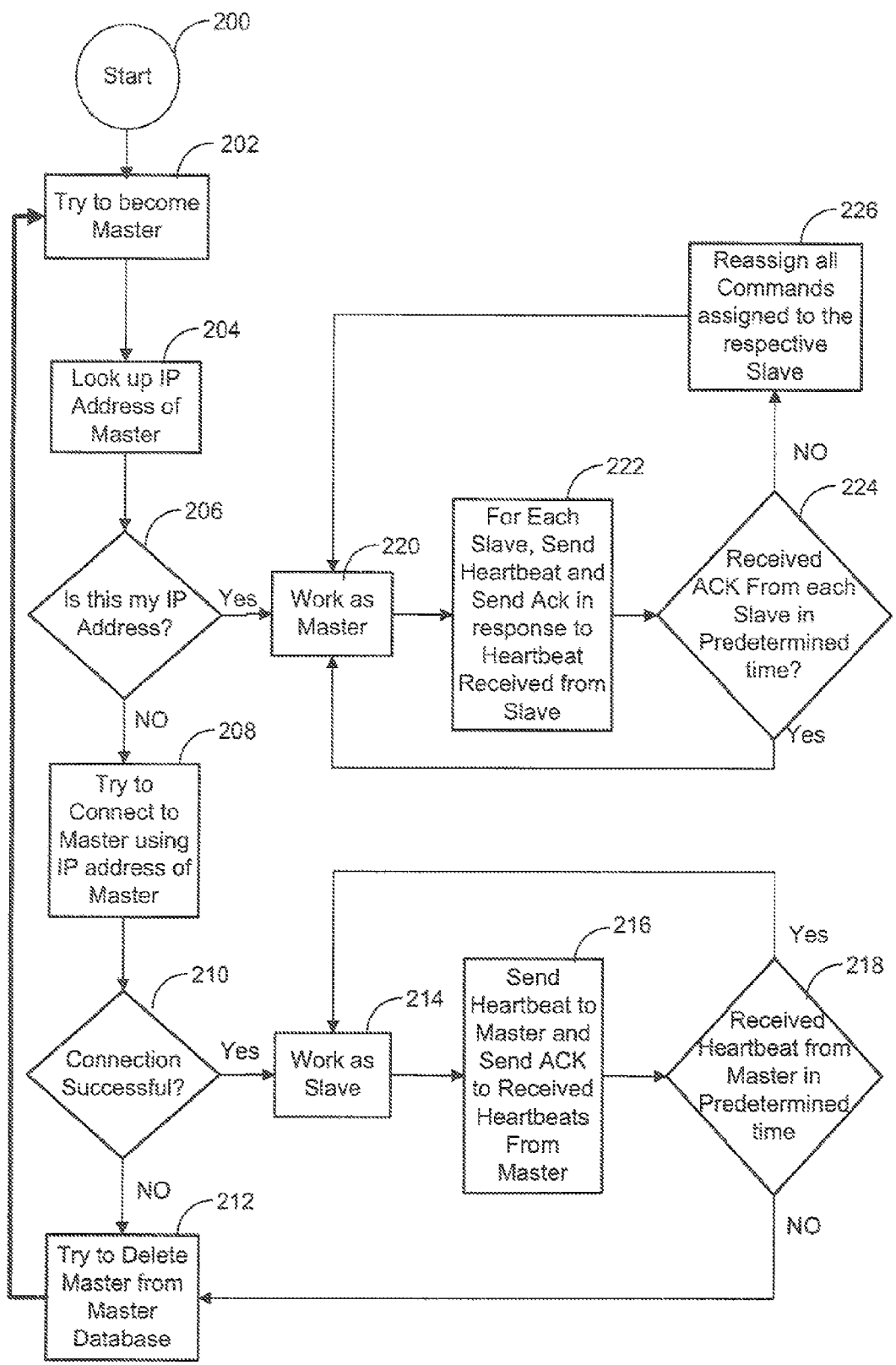
FIG. 8 is a flowchart of one aspect of a method for health maintenance for the zero single point of failure load balancer system of FIG. 1.

In one aspect, health maintenance service 50 uses communications message 54 to enable the slaves 23 and the master 21 to communicate to determine the health of system 20. The slaves 23 regularly send a communications message 54 to the master 21 requesting the master 21 return a communications message 54 that acknowledges the request. FIG. 8, which is discussed below, illustrates some aspects of health maintenance service 50 maintaining the health of the system 20 via a health maintenance algorithm and transitioning the load balancer 42 between slave 23 and master 21 states via a role transitioning algorithm. It should be noted that both the health maintenance algorithm and the role transitioning algorithm are common to all computing devices of the load balancer, thereby allowing the computing devices to manage the load balancer without the assistance of external controllers. In some aspects, health maintenance service 50 or load balancer 42 may comprise a pre-determined time 76 that may be used for making a determination of when a computing device 22 is reachable and when a computing device 22 should be determined unreachable. The predetermined time 76 may be an executable procedure that varies the time to wait for a communication message 54, otherwise referred to as a heartbeat, based on one or more factors, such as the load of the communication network 44. Additionally, in some aspects, the health maintenance service 50 will check whether an actual performance measure 78 for the slave 23 meets one or more criteria defined in a master performance requirement 82 before allowing a slave 23 to role transition into a master 21. For example, performance measure 78 may be the actual amount of memory or the actual number of concurrent processes the respective computing device 22 can execute at once, while the master performance requirement 82 may be the minimum amount of memory required to permit the device 22 to become a master 21, or it may be the minimum number of concurrent processes that can be executed on the slave 23 before permitting the slave 23 to become a master 21.

Referring to FIG. 8, one non-limiting example of a method 200 for maintaining the health of the system 20 includes actions taken by each computing device 22, via health maintenance service 50 of load balancer module 42, to allow for (i) role-transitioning between a master and a slave, (ii) working as a master, including, and (iii) working as a slave, including verify slave health and checking on the health of the master. Referring to Blocks 202, 204, 206, 208, 210 and 212, the role transitioning actions may be incorporated into a common role transitioning algorithm that allows each computing device 22 to attempt to become the master, or to try to become the master if a connection to the master cannot be established. Further, referring to Blocks 220, 222, 224 and 226, the health-related actions of working as a master include verify master health, checking on the health of the slaves, and redistributing any commands sent to slaves that are determined to be unhealthy or non-responsive. Additionally, referring to Blocks 214, 216 and 218, the health-related actions of working as a slave include verify slave health, checking on the health of the master, and if the health of the master cannot be verified, attempting to recover from the potential failure of the master by entering a role transition state and trying to become the master. It should be noted that the health-related actions of working as a master in Blocks 220, 222, 224 and 226, and the health-related actions of working as a slave in Blocks 214, 216 and 218, may be incorporated into a health maintenance algorithm common to and executable by the computing devices of the load balancer. Thus, method 200 allows system 20 to react to computing devices 22 malfunctioning or not responding, allows for new computing devices 22 to be added to the system 20, and provides a method to start the system 20.

Block 200 is a start block where the load balancer 42 may begin in the state of initializing a role transition. It should be realized that each of the computing devices 22 that are part of the system 20 may execute load balancer 42 so that many copies of load balancer 42 may be executing simultaneously on different computing devices 22, 24, and 26, but that each of the load balancers 42 may be in independent and potentially different states.

At Block 202 the load balancer 42 will try to become the master 21. In one non-limiting case, the load balancer 42 will attempt to become the master 21 by attempting to insert a row with master code 280 (FIG. 5), such as a constant value, in master table 36 (FIGS. 1 and 5) and the network ID 56 of the computing device 22 executing the respective load balancer 42. In this case, master code 280 is a primary key of the database so that only one of the load balancers 42 can succeed in writing to the master table 36. It should be noted that using the master table 36 and master code 280 having a constant value for a primary key of the master table 36 is only one way that a database table can be used to manage the shared resource of the identity of the master 21. Other ways are discussed below.

At Block 204 the load balancer 42 reads the master table 36 to read the network ID 56 of the master 21. In one aspect, this may be the IP address of the master 21.

At Block 206 load balancer 42 compares the network ID 56 of the computing device 22 executing load balancer 42 with the network ID 56 of the master 21. If the network IDs 56 are the same, then load balancer 42 was successful at becoming the master 21, so load balancer 42 enters into the master state (Block 220.) If the network IDs 56 are not the same, then load balancer 42 did not become the master 21, and further actions can occur before transitioning to a slave state.

At Block 208, load balancer 42 tries to connect to the master 21 using the network ID 56 read from the master table 36.

At Block 210 load balancer 42 determines if the connection to the master 21 was successful. In one aspect, the load balancer 42 determines if the connection to the master 21 was successful based on a predetermined wait time.

If the connection to the master 21 was not successful, then at Block 212 the load balancer 42 will attempt to delete the master 21 from the master table 36 using master code 280 and the network ID 56 of the master 21 just read from the master table 36. In one aspect, load balancer 42 attempts to delete the master 21 because the load balancer 42 assumes that if the master 21 is not reachable, then the master 21 is not functioning properly.

At Block 214, if the connection to the master is successful in Block 210, then load balancer 42 works as a slave 23. In general, work as a slave comprises accepting and executing commands from the master 21, and then returning the results to the master 21 or a returning a reference to where the results are stored, such as in a database. In some aspects, accepting commands 40 and returning results of executing the commands 40 is done with communication messages 54 over TCP/IP.

At Block 216, the load balancer 42 working as a slave 23 sends communication message 54 comprising a heartbeat to the master 21 using the network ID 56 of the master 21 read from the master table 36. In some aspects the load balancer 42 of the master 21 may build a slave ID table 84 (FIG. 2) based on the received heartbeats from the slaves.

At Block 218 the load balancer 42 working as a slave 23 determines if communication message 54 comprising an acknowledgement was received from the master 21. If an acknowledgement is not received from the master 21, then the load balancer 42 acting as a slave 23 assumes that the master 21 is not functioning properly and goes to Block 212 to try and delete the master 21. If an acknowledgement is received from the master 21, then the load balancer 42 acting as a slave 23 goes back to Block 214. In one aspect, the load balancer 42 uses a predetermined time to wait for an acknowledgement until determining that the master 21 is not reachable and assuming that the master 21 is not functioning properly.

Returning to Block 206, when the load balancer 42 determines that it is the master 21, the load balancer 42 proceeds to work as the master 21 in Block 220. In general, working as the master 21 includes the tasks related to maintaining the health of the system 20, sending commands for the slaves 23 to execute, receiving the results of the slaves 23 executing the commands, checking if all the commands in a group of sub-commands have been executed, and determining if each of the slaves 23 is functioning properly.

At Block 222, the load balancer 42 sends a communication message 54 comprising an acknowledgement in response to each heartbeat 54 received from a slave 23. Further, the load balancer 42 sends a heartbeat 54 to each of the slaves 23. In some aspects, the heartbeat and the acknowledgement may be sent using TCP/IP. The master 21 may maintain a list of the network IDs 56 of the slaves 23, such as a slave ID table 84, and update the list based on the received heartbeats from the slaves 23.

At Block 224, the load balancer 42 determines whether or not each of the slaves 23 has sent an acknowledgement to the heartbeat message. The load balancer 42 may make this determination based on the waiting a predetermined amount of time for an acknowledgement from each slave 23.

At Block 226, the load balancer 42 redistributes the commands assigned to each of the slaves 23 that was determined not to be functioning properly based on not being reachable. In some aspects, the load balancer 42 may determine whether the slave 23 is functioning properly based on performance measures of the slave 23 or some other predetermined metric. The load balancer 42 then returns to Block 220.

Thus, the load balancer 42 is operable to maintain the health of the system 20 by enabling each of the computing devices 22 to become either a slave 23 or a master 21, and by regularly determining whether each of the slaves 23 and the master 21 are functioning properly.

Additionally, referring to FIGS. 1 and 7, distribution service module 48 may be stored in and executed from a memory of a computing device 22. Distribution service module 48 may comprise one or any combination of hardware, software, firmware, data and executable instructions operable to provide respective computing devices 22 with the ability to distribute the commands 40, which may be a list of sub-commands, to respective user command executor 46 of slaves 23 and/or to user command executor 46 of the master 21, and then to combine the executed commands, and in some aspects return a result responsive to queue input module 38. Further, distribution service module 48 enables the computing devices 22 to redistribute commands that were distributed to slaves 23 that stopped functioning properly. Further, distribution service module 48 enables queue input module 38 to add commands 40 for execution on the system 20. In some aspects, distribution service module 48 maintains horizontal as well as vertical load balancing for the system 20 by determining which computing device 22 to distribute the command 40 to. Horizontal balancing refers to balancing the commands 40 across the slaves 23 and/or the master 21. Vertical balancing refers to balancing how much of a load a single computing device 22 has been assigned. In one non-limiting case, for example, distribution service module 48 communicates with the slaves 23 and receives utilization from the slaves 23 indicative of the load of the slaves 23. The distribution service module 48 will then determine which of the slaves 23 to distribute a command to based on the received utilization. In addition, or alternatively, the distribution service module 48 may base distribution determinations based on other information received from the slaves 23, e.g. the maximum number of processes each of the slaves 23 can handle. In some aspects, the distribution service 44 may distribute a command 36 to the master 21.

In some aspects, distribution service module 48 may maintain the status of the commands 40 by using database 30. In one non-limiting example, referring to FIGS. 1, 3 and 4, two tables 32 and 34 of the database 30 may be used. In some aspects, distribution service module 48 regularly updates sub-command index table 34, so that if the master 21 malfunctions, then a new master 21 can use the sub-command index table 34 to continue the distribution of the commands without having lost the work completed. Additionally, distribution service module 48 may use command index table 32 to keep track of the distribution of the processing of each command 40.

Thus, by distribution service module 48 using a database 30 to maintain the commands 40, and by regularly updating sub-command index table 34 and command index table 32, then if the master 21 stops functioning properly, a new master 21 may continue to distribute the commands 40 without losing the work of the slaves 23, and thereby contributing to a system 20 for a zero point of failure load balancer.

Further, in one non-limiting case, distribution service module 48 may use communications message 54 to distribute the commands 40 to the slaves 23. Further, the slaves 23 may use communications message 54 to return the results to the master 21.

Additionally, referring to FIGS. 1 and 7, database service module 52 may be stored in and executed from memory 64. Database service module 52 may comprise one or any combination of hardware, software, firmware, data and executable instructions operable to provide respective computing devices 22 with the ability to read and write to the database 30. In some aspects, database service module 52 may use application program interface for a database management system such as ORACLE to provide a convenient means for the computing device 22 to read and write to the database 30.

Thus, database service 48 enables computing device 22 to read and write rows or tuples to the tables 32, 34, 36 of the database 30.

Additionally, referring to FIG. 1, user command executor 46 may be stored in and executed from a memory of a respective computing device 22. User command executor 46 may comprise one or any combination of hardware, software, firmware, data and executable instructions operable to provide respective computing devices 22 with the ability to execute commands 40. In some aspects, user command executor 46 may fork a thread to execute the command 40. In other aspects, user command executor 46 may be an application program that can execute the commands 40 directly. In general, user command executor 46 enables the computing device 22 to execute any command 40 on the computing device 22 and further may provide the functionality to communication with remote devices such as communication device 28. In general, user command executor 46 takes and executes a command, and then sends the result to the master 21 over the communication network 44. In the alternative, or in addition, the user command executor 46 may store the result in some form of memory or storage in the database 30 and/or in on the slave 23 and/or the master 21. Thus, user command executor 46 enables computing device 22 to execute commands.

Referring to FIG. 1, additionally and/or in the alternative, load balancer 42 may enable the functionality of the system 20 using threads of an operating system. Note that for convenience, the functionality of the threads are explained without linking the functionality to a sub-module of load balancer 42. In one non-limiting example, the threads created on a computing device 22 for the master 21 may comprise a master thread whose tasks include creating a database handle thread, running a TCP/IP server on a user defined port number for communicating with the slaves 23, and creating a separate slave handle thread for each slave 23 that communicates with the master 21. The tasks of the database handle thread include reading and writing the database tables 32, 34, and 36. The tasks of the slave handle thread include sending a message to the slave 23 to insure the slave 23 is still functioning, sending the commands to the slaves 23, and receiving the result of the slaves 23 executing commands 40. The threads created on a computing device 22 for the slave 23 may comprise a slave thread whose tasks include making TCP/IP connection with the master 21, sending information regarding performance to the master 21 (e.g. the maximum number of simultaneous processes that can be run on the slave 23), sending heartbeats to the master 21, receiving heartbeats from the master, and sending and receiving acknowledgments to and from the master 21. The slave 23 and master 21 may comprise a fork next process thread whose tasks include executing commands received from the master 21. Thus, the functionality of the master 21 and the slave 23 may be enabled using a threaded operating system.

Additionally, referring back to FIG. 1, communications network 44 may comprise any data and/or voice communications network. For example, communications network 44 may comprise all or some portion of any one or any combination of: a wired or wireless telephone network; a terrestrial telephone network; a satellite telephone network; an infrared network such as an Infrared Data Association (IrDA)-based network; a short-range wireless network; a Bluetooth® technology network; a ZigBee® protocol network; an ultra wide band (UWB) protocol network; a home radio frequency (HomeRF) network; a shared wireless access protocol (SWAP) network; a wideband network, such as a wireless Ethernet compatibility alliance (WECA) network, a wireless fidelity alliance (Wi-Fi Alliance) network, and a 802.xx network; a packet data network; a data network; an Internet Protocol (IP) Multimedia Subsystem (IMS) network; a public switched telephone network; a public heterogeneous communications network, such as the Internet; a private communications network; a multicast network such as a Forward Link Only (FLO) network, including the MediaFLO™ System available from Qualcomm, Inc. of San Diego, Calif.; a digital video broadcasting (DVB) network, such as DVB-S for satellite, DVB-C for cable, DVB-T for terrestrial television, DVB-H for terrestrial television for handhelds; and a land mobile radio network.

Further, examples of telephone networks that may be included in some aspects of communications network 44 include at least a portion of one, or any combination, of analog and digital networks/technologies, such as: code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Referring to FIG. 8, in operation, one non-limiting case of a method for zero point of failure load balancer system at a slave device comprises determining if a master is functioning (Block 300). For example, in one non-limiting case, referring to FIGS. 1 and 6, slave 23 may send a communication message 54 to the master 21 and wait for an acknowledgement 54 from the master 21. The slave 23 may base the determination of whether the master 21 is functioning based on a predetermined time 76 (FIG. 2) that has elapsed since the slave 23 sent the communication message 54 to the master 21, or in other aspects, the slave 23 may base the determination on some performance measure of the master 21.

The method may further include attempting to become the master by using a database for managing communication with at least one other slave, if the master is not functioning (Block 302). For example, in one non-limiting case, referring to FIGS. 1, 5 and 6, slave 23 may write to a master table 36. The slave 23 may implement some variant of Dijkstra's algorithm for implementing a semaphore, or in the alternative the slave 23 may use a single row or tuple in the master table 36 with each slave 23 attempting to set the row with the same constant value for a field that is also the primary key to the master table 36, thus permitting only one of the slaves 23 to write the row in the master table 36 and thus becoming the new master 21.

Optionally, the method may further include receiving at least one command to execute; and sending the results of executing the command to the master. Referring to FIG. 1 a slave 23 may receive a command 40 to execute and then execute the command 40 and then send the results back to the master 21. In some aspects, the slave 23 may write the results of the execution to the database 30 and send the master 21 an indication that the execution is completed. The slave 23 may communicate with the master 21 using a communication message 54, which in some aspects may be sent using TCP/IP.

Optionally, the method may further include receiving a message from the master; and sending an acknowledgement to the master (Block 306). In one non-limiting case, for example, the slave 23 may receive a communication message 54 from the master 21 requesting that the slave 23 acknowledge the communication message 54 from the master 21. The master 21 and slave 23 may communicate over TCP/IP using a local area network (LAN).

Figure 9:
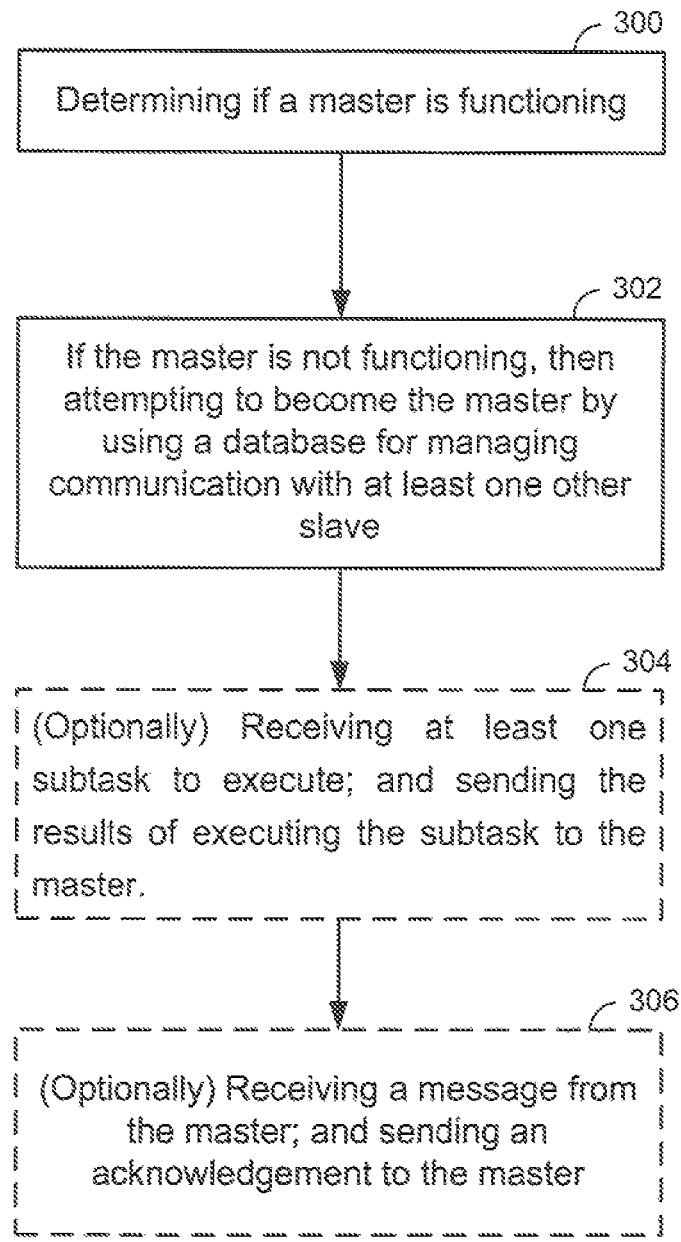
FIG. 9 is a flowchart of one aspect of a method for a slave of a zero single point of failure load balancer system.
Figure 10:
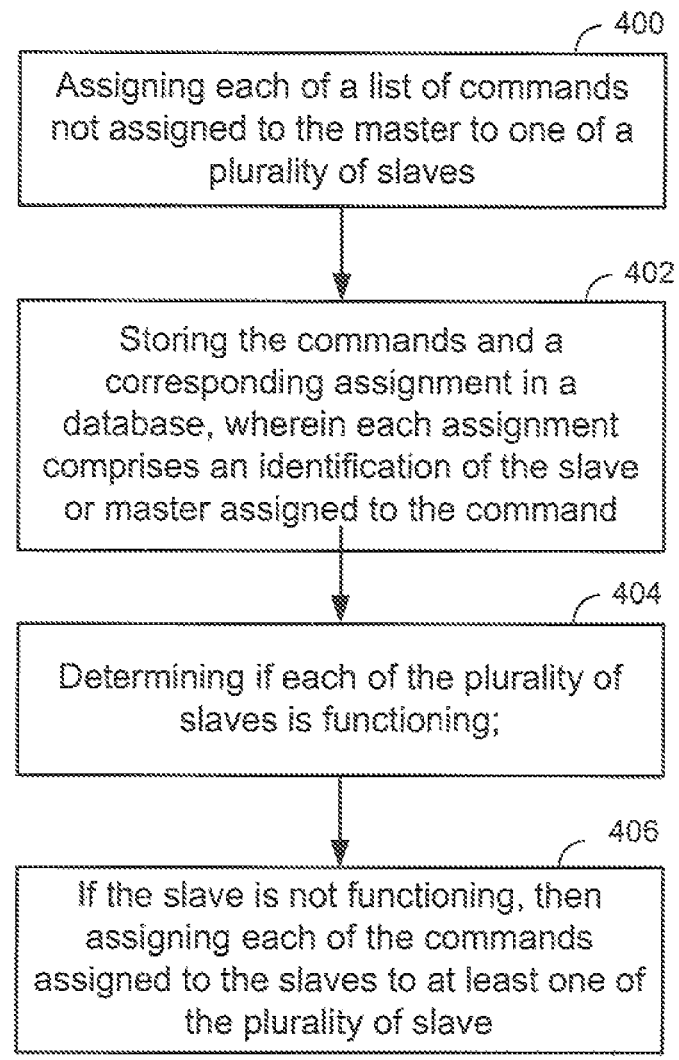
FIG. 10 is a flowchart of one aspect of a method for a master of a zero single point of failure load balancer system.

Referring to FIG. 9, in operation, one non-limiting case of a method for zero point of failure load balancer system at a master device comprises assigning each of the commands not executed by the master to one of a plurality of slaves (Block 400.) For example, in one non-limiting case, referring to FIGS. 1 and 3, the master 21 may assign the commands 40 to the slaves 23 with a communication message 54 and write to the sub-command index table 34 both the commands 40 and the slave 23 assigned to the commands 40.

The method may further include storing the commands and a corresponding assignment in a database, wherein each assignment comprises an identification of the slave or master assigned to the command (Block 402). For example, in one non-limiting case, referring to FIGS. 1, 4, and 5 two tables 32 and 34 of the database 30 may be used to maintain the status of the commands 40.

The method may further include determining if each of the plurality of slaves is functioning (Block 404.) For example, in one non-limiting case, referring to FIGS. 1 and 3 the master 21 may send a communication message 54 to each of the slaves 23 (Block 222 of FIG. 3) and if the slave 23 does not return a communication message 54 in a predetermined amount of time, then the master 21 will assume that the slave 23 is not functioning.

The method may further include assigning each of the commands assigned to the slaves to at least one of the plurality of slaves 23, if the slave is not functioning (Block 406.) For example, in one non-limiting case, referring to FIGS. 1 and 3 master 21 may reassign the commands to other slaves 23 (Block 226 of FIG. 3.) The master 21 may examine the sub-command index table 34 and for each command 40 assigned to the slave 23 that is not functioning and/or unreachable, the master 21 may reassign the command 40 to another slave 23.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Further, in some aspects, at least one processor may comprise one or more modules operable to cause a computer to perform the steps and/or actions of any method or algorithm described herein. Additionally, in some aspects, the steps and/or actions of a method or algorithm may reside as one or any combination or set of codes or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A computer-implemented method for a slave computing apparatus of a load balancer, comprising:
    determining, according to a common predetermined health maintenance algorithm independently operable by each of a plurality of slaves in the load balancer, if a master of the load balancer is functioning; and
    if the master is not functioning, then attempting to become the master according to a common predetermined role transitioning algorithm independently operable by each of the plurality of slaves in the load balancer, wherein the predetermined role transitioning algorithm includes using a communication interface with a separate database of the load balancer for setting a master network identification in a master database table stored on the separate database of the load balancer to a self network identification before at least one other slave sets a corresponding other slave network identification as the master network identification in the master database table, and
    wherein attempting to become the master further includes setting the self network identification in a master network identification portion of the master database table having a master code, wherein the master code comprises a predetermined constant value for a primary key of the master database table that controls access to the master network identification portion to implement a semaphore so that only a single slave is able to successfully write to the master table.

2. The method of claim 1, wherein attempting to become the master further comprises:
    reading the master network identification from the portion of the master database table based on the master code; and
    attempting to delete the portion of the master database table comprising the master code and the master network identification.

3. The method of claim 1, further comprising:
    reading the master network identification from a portion of the master database table corresponding to the master code;
    checking if the master network identification corresponds to the self network identification;

if the master network identification does not correspond to the self network identification, then working as a slave; and else if the master network identification corresponds to the self network identification, then working as the master.

4. The method of claim 1, where determining if the master is functioning, further comprises:
sending a communication to the master based on the master network identification; and
if an acknowledgement is not received from the master in a predetermined time, then attempting to become the master.

5. The method of claim 1, wherein determining if the master is functioning, further comprises sending a communication message to the master using transport control protocol/internet protocol (TCP/IP) over a local area network (LAN).

6. The method of claim 1, further comprising:
receiving a communication message from the master; and
sending an acknowledgement to the master.

7. The method of claim 1, further comprising:
receiving from the master at least one command to execute; and
sending a result of executing the command to the master.

8. The method of claim 7, further comprising executing the command, wherein executing the command comprises processing a performance statistic corresponding to at least one wireless device operating on a wireless network.

9. The method of claim 1, further comprising:
obtaining a master performance requirement; and
obtaining an actual performance measurement of the slave; and
allowing the slave to become the master only if the actual performance measurement meets the master performance requirement.

10. A non-transitory computer-readable storage medium having stored thereon processor-executable software instructions configured to cause a slave processor to perform operations for load balancing, the operations comprising:
determining, according to a common predetermined health maintenance algorithm independently operable by each of a plurality of slaves in the load balancer, if a master of the load balancer is functioning; and
attempting, if the master is not functioning, to become the master according to a common predetermined role transitioning algorithm independently operable by each of the plurality of slaves in the load balancer, wherein the predetermined role transitioning algorithm includes using a communication interface with a separate database of the load balancer for setting a master network identification in a master database table stored on the separate database of the load balancer to a self network identification before at least one other slave sets a corresponding other slave network identification as the master network identification in the master database table, and
wherein attempting to become the master further includes setting the self network identification in a master network identification portion of the master database table having a master code, wherein the master code comprises a predetermined constant value for a primary key of the master database table that controls access to the master network identification portion to implement a semaphore so that only a single slave is able to successfully write to the master table.

11. A slave apparatus of a load balancer, comprising:
a processor; and
a memory in communication with the processor to enable services on the slave apparatus,
wherein the processor is configured with processor-executable instructions to perform operations to provide a health management service operable to determine, according to a common predetermined health maintenance algorithm independently operable by each of a plurality of slaves in the load balancer, if a master is functioning and further operable, if the master is not functioning, to attempt to become the master according to a common predetermined role transitioning algorithm independently operable by each of the plurality of slaves in the load balancer, wherein the predetermined role transitioning algorithm includes using a communication interface with a separate database of the load balancer for setting a master network identification in a master database table stored on the separate database of the load balancer to a self network identification before at least one other slave sets a corresponding other slave network identification as the master network identification in the master database table,
wherein in response to the health management service, the database service is further operable to set the self network identification in a master network identification portion of the master database table having a master code, wherein the master code comprises a predetermined constant value for a primary key of the master database table that controls access to the master network identification portion to implement a semaphore so that only a single slave is able to successfully write to the master table, and
wherein the processor is configured with processor-executable instructions to perform operations to provide a database service in communication with the health management service and operable to read and write to the master database table responsive to the health management service.

12. The slave apparatus of claim 11, wherein in response to the health management service, the database service is further operable to:
read the master network identification from the portion of the master database table based on the master code; and
attempt to delete the portion of the master database table comprising the master code and the master network identification.

13. The slave apparatus of claim 11, wherein at least one of the health management service or the database service is further operable to:
read the master network identification from the portion of the master database table corresponding to the master code;
check if the master network identification corresponds to the self network identification;
if the master network identification does not correspond to the self network identification, then cause the slave apparatus to work as a slave; and
else if the master network identification corresponds to the self network identification, then cause the slave apparatus to work as the master.

14. The slave apparatus of claim 11, wherein the health management service is further operable to:
send a communication to the master based on the master network identification; and
if an acknowledgement is not received from the master in a predetermined time, then attempt to become the master.

15. The slave apparatus of claim 11, wherein the health management service is further operable to send a communication message to the master using transport control protocol/internet protocol (TCP/IP) over a local area network (LAN).

16. The slave apparatus of claim 11, wherein the processor is configured with processor-executable instructions to perform operations further comprising:
receiving a communication message from the master; and
sending an acknowledgement to the master.

17. The slave apparatus of claim 11, wherein the processor is configured with processor-executable instructions to perform operations to provide a user command executor operable to receive a command from the master over a communication network, execute the command, and send a result of executing the command to the master over the communications network.

18. The slave apparatus of claim 11, wherein the user command executor is further operable to process a performance statistic corresponding to at least one wireless device operating on a wireless network.

19. The slave apparatus of claim 11, further comprising a memory having a master performance requirement and an actual performance measurement of the slave, wherein the health maintenance service is further operable to allow the slave to become the master if the actual performance measurement meets the master performance requirement.

20. A computer-implemented method for a master computing apparatus of a load balancer, comprising:
executing a common predetermined role transitioning algorithm to transition to a slave or become a master, wherein the common predetermined role transitioning algorithm is independently operable by each of a plurality of slaves in the load balancer and includes using a communication interface between the slave and a separate database of the load balancer for setting a master network identification in a master database table stored on the separate database of the load balancer to a self network identification in a master network identification portion of the master database table having a master code, wherein the master code comprises a predetermined constant value for a primary key of the master database table that controls access to the master network identification portion to implement a semaphore so that only a single slave is able to successfully write to the master table, before at least one other slaves sets a corresponding other slave network identification as the master network identification in the master database table;
executing a common predetermined health maintenance algorithm to verify master health and determine health of each of the plurality of slaves, wherein the common predetermined health maintenance algorithm is independently operable by each of the plurality of slaves in the load balancer;
assigning each of a group of commands to at least one of the plurality of slaves determined to be functioning based on the execution of the predetermined health maintenance algorithm;
storing the commands and a corresponding assignment in a database table, wherein each assignment comprises a network identification for one of the plurality of slaves assigned to the respective command;
checking a command status in the database table for each of the group of commands, wherein the command status indicates whether or not the respective command has been executed; and
executing a callback function when all the commands are executed as determined based on the command status.

21. The method of claim 20, wherein executing the callback function further comprises executing a command script on at least one result generated by execution of each of the group of commands.

22. The method of claim 20, wherein executing the common predetermined health maintenance algorithm further comprises:
determining if each of the plurality of slaves is functioning; and
if a respective one of the plurality of slaves is not functioning, then re-assigning each respective command assigned to the respective slave not functioning to at least one of the plurality of slaves that is functioning, wherein executing the callback function is based on the re-assigning.

23. The method of claim 22, wherein determining if each of the slaves is functioning, further comprises:
sending a communication message to each of the plurality of slaves; and
if an acknowledgement is not received from each of the plurality of slaves in a predetermined time, setting the slave as not functioning.

24. The method of claim 23, wherein sending further comprises sending a communication message to each of the plurality of slaves using transport control protocol/internet protocol (TCP/IP) over a local area network (LAN).

25. The method of claim 20, wherein assigning further comprises assigning based on a number of commands already assigned to each of the plurality of slaves.

26. The method of claim 20, wherein assigning further comprises assigning based on a utilization of each of the plurality of slaves.

27. The method of claim 20, further comprising building a slave identification table by using received communication messages from each of the plurality of slaves, wherein the slave identification table includes a network identification for each slave.

28. The method of claim 20, further comprising executing the common predetermined health maintenance algorithm prior to becoming the master to determine a health of an existing master, and wherein the executing of the common predetermined role transitioning algorithm to become the master is triggered based on a determination that the existing master is not functioning.

29. The method of claim 28, wherein becoming the master further comprises:
determining an actual performance measure;
determining a master performance requirement; and
if the actual performance measure meets the master performance requirement, then acting as the master.

30. A non-transitory computer-readable storage medium having stored thereon processor-executable software instructions configured to cause a processor to perform operations comprising:
executing a common predetermined role transitioning algorithm to transition to a slave or become a master, wherein the common predetermined role transitioning algorithm is independently operable by each of a plurality of slaves in the load balancer and includes using a communication interface with a separate database of the load balancer for setting a master network identification in a master database table stored on the separate database of the load balancer having a master code, wherein the master code comprises a predetermined constant value for a primary key of the master database table that controls access to the master network identification portion of the master database to implement a semaphore so that only a single slave is able to successfully write to the master table, to a self network identification before at least one other slaves sets a corresponding other slave network identification as the master network identification in the master database table;
executing a common predetermined health maintenance algorithm to verify master health and determine health of each of the plurality of slaves, wherein the common predetermined health maintenance algorithm is independently operable by each of the plurality of slaves in the load balancer;
assigning each of a group of commands to at least one of the plurality of slaves determined to be functioning based on the execution of the predetermined health maintenance algorithm;
storing the commands and a corresponding assignment in a database table, wherein each assignment comprises a network identification for one of the plurality of slaves assigned to the respective command;
checking a command status in the database table for each of the group of commands, wherein the command status indicates whether or not the respective command has been executed; and
executing a callback function when all the commands are executed as determined based on the command status.

31. A master apparatus of a load balancer, comprising:
a processor;
a memory in communication with the processor to enable services on the master apparatus, wherein:
the processor is configured with processor-executable instructions to perform operations to provide a health maintenance service operable to execute a common predetermined role transitioning algorithm to transition to a slave or become a master, wherein the common predetermined role transitioning algorithm is independently operable by each of a plurality of slaves in the load balancer and includes using a communication interface with a separate database of the load balancer for setting a master network identification in a master database table stored on the separate database of the load balancer having a master code, wherein the master code comprises a predetermined constant value for a primary key of the master database table that controls access to the master network identification portion of the master database to implement a semaphore so that only a single slave is able to successfully write to the master table, to a self network identification before at least one other slaves sets a corresponding other slave network identification as the master network identification in the master database table;
the processor is configured with processor-executable instructions to perform operations such that the health maintenance service is further operable to execute a common predetermined health maintenance algorithm to verify master health and determine health of each of the plurality of slaves, wherein the common predetermined health maintenance algorithm is independently operable by each of the plurality of slaves in the load balancer;
the processor is configured with processor-executable instructions to perform operations to provide a distribution service operable to assign each of a group of commands to at least one of the plurality of slaves determined to be functioning based on the execution of the predetermined health maintenance algorithm;
the processor is configured with processor-executable instructions to perform operations to provide a database service in communication with the distribution service and operable to store the commands and a corresponding assignment in a database table, wherein each assignment comprises a network identification for one of the plurality of slaves assigned to the respective command;
the processor is configured with processor-executable instructions to perform operations such that the distribution service is further operable to check a command status in the database table for each of the group of commands, wherein the command status indicates whether or not the respective command has been executed; and
the processor is configured with processor-executable instructions to perform operations to provide a user command executor operable to execute a callback function when all the commands are executed as determined based on the command status.

32. The master apparatus of claim 31, wherein the processor is configured with processor-executable instructions to perform operations such that the callback function comprises a command script executable on at least one result generated by execution of each of the group of commands.

33. The master apparatus of claim 31, wherein the processor is further configured with processor-executable instructions to perform operations to provide a health maintenance service in communication with the distribution service, wherein the health maintenance service is operable to:
determine if each of the plurality of slaves is functioning; and
if a respective one of the plurality of slaves is not functioning, then to re-assign each respective command assigned to the respective slave not functioning to at least one of the plurality of slaves that is functioning, wherein execution of the callback function is based on the re-assignment.

34. The master apparatus of claim 33, wherein the health maintenance service is further operable to:
send a communication message to each of the plurality of slaves; and
if an acknowledgement is not received from each of the plurality of slaves in a predetermined time, then set the slave as not functioning.

35. The master apparatus of claim 34, wherein the health maintenance service is further operable to send a communication message to each of the plurality of slaves using transport control protocol/internet protocol (TCP/IP) over a local area network (LAN).

36. The master apparatus of claim 31, wherein the distribution service is further operable to assign based on a number of commands already assigned to each of the plurality of slaves.

37. The master apparatus of claim 31, wherein the distribution service is further operable to assign based on a utilization of each of the plurality of slaves.

38. The master apparatus of claim 31, wherein the database service is further operable to build a slave identification table by using received communication messages from each of the plurality of slaves, wherein the slave identification table includes a network identification for each slave.

39. The master apparatus of claim 31, wherein, prior to becoming the master, the health maintenance service is further operable to execute the common predetermined health maintenance algorithm to determine a health of an existing master, and wherein the health maintenance service is triggered to execute the common predetermined role transitioning algorithm to become the master based on a determination that the existing master is not functioning.

40. The master apparatus of claim 39, further comprising a memory having an actual performance measure and a master performance requirement, wherein the health maintenance service is further operable to enable the master apparatus to act as the master if the actual performance measure meets the master performance requirement.

* * * * *